United States Patent
Taki et al.

(10) Patent No.: US 8,025,450 B2
(45) Date of Patent: Sep. 27, 2011

(54) LENS FRAME, LENS ASSEMBLY AND IMAGE-TAKING APPARATUS

(75) Inventors: Ikuo Taki, Odawara (JP); Ryota Sasaki, Saitama (JP); Yuya Sakai, Saitama (JP); Yasunori Tanaka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/559,699

(22) Filed: Sep. 15, 2009

(65) Prior Publication Data

US 2010/0080552 A1 Apr. 1, 2010

(30) Foreign Application Priority Data

Sep. 30, 2008 (JP) .................................. 2008-254773

(51) Int. Cl.
*G03B 17/00* (2006.01)
(52) U.S. Cl. .......................... 396/529; 359/819; 348/335
(58) Field of Classification Search ................. 396/529; 359/819; 348/335
See application file for complete search history.

(56) References Cited

U.S. PATENT DOCUMENTS

| | | | |
|---|---|---|---|
| 4,281,916 A | 8/1981 | Aoyagi | |
| 5,502,598 A | 3/1996 | Kimura et al. | |
| 5,523,815 A | 6/1996 | Tamura | |
| 5,719,711 A | 2/1998 | Shiba | |
| 5,781,351 A * | 7/1998 | Murakami et al. | ............. 359/808 |
| 5,864,739 A | 1/1999 | Kaneko et al. | |
| 6,144,509 A | 11/2000 | Baker | |
| 6,424,473 B1 | 7/2002 | Nakane et al. | |
| 7,576,930 B2 | 8/2009 | Yu | |
| 2001/0040740 A1 * | 11/2001 | Funakoshi | ..................... 359/819 |
| 2004/0197038 A1 | 10/2004 | Fujita et al. | |
| 2006/0152826 A1 * | 7/2006 | Tsutsui | ......................... 359/824 |
| 2006/0204781 A1 | 9/2006 | Takei | |
| 2007/0076309 A1 | 4/2007 | Shimizu et al. | |
| 2007/0188699 A1 | 8/2007 | Cech et al. | |
| 2007/0191209 A1 | 8/2007 | Hyuga et al. | |
| 2008/0031103 A1 * | 2/2008 | Horinouchi et al. | ........ 369/44.37 |
| 2008/0055754 A1 * | 3/2008 | Sakamoto | ...................... 359/830 |
| 2008/0070815 A1 | 3/2008 | Kamada et al. | |
| 2008/0252775 A1 * | 10/2008 | Ryu et al. | ...................... 348/374 |

(Continued)

FOREIGN PATENT DOCUMENTS

JP 1-243245 9/1989

(Continued)

OTHER PUBLICATIONS

Office Action dated Oct. 15, 2009 issued in co-pending U.S. Appl. No. 12/404,017.

(Continued)

*Primary Examiner* — Christopher E Mahoney
*Assistant Examiner* — Fang-Chi Chang
(74) *Attorney, Agent, or Firm* — Birch, Stewart, Kolasch & Birch, LLP

(57) ABSTRACT

A lens assembly made of porous ceramic is provided with concave sections into which an adhesive for fixing lenses inserted into a lens frame is injected. Each of the concave sections has an outward opening and a spacing wall provided between a hollow part of the lens frame and the opening. The adhesive injected into the concave sections passes through multiple pores in the lens frame made of porous ceramic, and reaches the periphery of each of the lenses, thereby fixing the lenses to an inner wall of the hollow part of the lens frame.

6 Claims, 4 Drawing Sheets

U.S. PATENT DOCUMENTS

| | | | |
|---|---|---|---|
| 2009/0103193 A1* | 4/2009 | Berube | 359/819 |
| 2009/0244726 A1 | 10/2009 | Sakai et al. | |

FOREIGN PATENT DOCUMENTS

| | | |
|---|---|---|
| JP | 2000-357333 | 12/2000 |
| JP | 2001-027723 | 1/2001 |
| JP | 2002-23091 A | 1/2002 |
| JP | 2006-284991 A | 10/2006 |
| JP | 2006-292927 A | 10/2006 |
| JP | 2007-094242 | 4/2007 |
| JP | 2007-199235 | 8/2007 |
| JP | 2007-238430 A | 9/2007 |
| JP | 2007-279557 A | 10/2007 |
| JP | 2008-88528 A | 3/2008 |
| JP | 2008-254769 A | 9/2008 |
| JP | 2008-254771 A | 9/2008 |
| JP | 2008-254772 A | 9/2008 |
| JP | 2008-254775 A | 9/2008 |
| JP | 2009-206117 A | 9/2009 |
| JP | 2008-88528 A | 10/2009 |
| JP | 2009-296542 | 12/2009 |

OTHER PUBLICATIONS

Chen Jianmin et al., "Developing Situation and Application of Bonded Solid Lubricant Films". Tribology, vol. 14, No. 2, pp. 180-189, Apr. 1994.

Chinese Office Action issued in Chinese Patent Application No. 200910253004 X corresponding to co-pending U.S. Appl. No. 12/559,718 on Dec. 31, 2010.

JPO Notification issued on Apr. 6, 2011 in foreign counterpart Application JP 2008-254769 of co-pending U.S. Appl. No. 12/559,783.

Notice of Allowance issued in U.S. Appl. No. 12/559,783, dated Jan. 6, 2011.

U.S. Office Action issued in co-pending U.S. Appl. No. 12/559,680 issued on Dec. 27, 2010.

U.S. Office Action issued in co-pending U.S. Appl. No. 12/559,718 dated Feb. 2, 2011.

Chinese Office Action issued in corresponding Chinese Application No. 200910205755.4 on Jan. 11, 2011.

Notice of Allowance issued in copending U.S. Appl. No. 12/559,718, dated May 23, 2011.

Notice of Allowance issued in copending U.S. Appl. No. 12/559,783, dated May 13, 2011.

* cited by examiner

LENS FRAME, LENS ASSEMBLY AND IMAGE-TAKING APPARATUS

BACKGROUND OF THE INVENTION

1. Field of the Invention

The present invention relates to a lens frame into which two or more lenses are inserted, a lens assembly equipped with the lens frame, and an image-taking apparatus provided with the lens assembly.

2. Description of the Related Art

In recent years, automobiles have been provided with cameras. Meanwhile, nowadays, automobiles are equipped with display screens thanks to the widespread use of car navigation systems. Therefore, many of cameras installed in automobiles can display the state of a blind spot for a driver on a display screen provided in front of the driver's seat.

Incidentally, automobiles may be left outdoors in hot summer and in freezing winter and therefore, a camera installed in an automobile is required to operate properly over an extremely wide range of temperatures. In order to guarantee the proper operation of a vehicle-mounted camera, a lens assembly employed in such a camera needs to be not only lightweight and robust as generally required, but also resistant to stretching and shrinking with temperature for the purpose of preventing the occurrence of a blur due to a change in temperature. To meet these needs, ceramic barrels have been devised (see, for example, Japanese Patent Application Publications No. 2006-284991 and No. 2006-292927). Also, the inventors of the present application have proposed to apply porous ceramic to an optical component (see, for example, Japanese Patent Application Publication No. 2007-238430). The porosity of the porous body described in the specification of Japanese Patent Application Publication No. 2007-238430 is equal to or more than 10%.

Further, for instance, Japanese Patent Application Publication No. 2007-279557 describes a lens assembly having such a structure that lenses and spacing rings are inserted into a lens barrel through the front opening of the lens barrel, and a pressing ring is screwed on a front part of the lens barrel, thereby fixing the lenses to the lens barrel. A structure in which a porous ceramic barrel is applied to the structure of Japanese Patent Application Publication No. 2007-279557 will be described.

FIG. 1 is a diagram that illustrates an example of the structure of a lens assembly provided with a lens frame made of porous ceramic.

A lens assembly 1 illustrated in FIG. 1 is provided with a barrel 10, and the barrel (lens frame) 10 has a hollow part 100 having an object-side opening 101 and an image-forming-side opening 102. Formed on an object-side periphery of the barrel 10 is a male thread SR1. From the object-side opening 101, lenses L1 trough L4 and spacing rings SP1 through SP3 are inserted while being aligned along the optical axis. These elements L1 through L4 and SP1 through SP3 may be collectively referred to as optical members. In this example, as shown in FIG. 1, the lenses L1 trough L4 and the spacing rings SP1 through SP3 are alternately disposed and sequentially inserted into the hollow part 100 of the lens barrel 10.

Furthermore, the lens assembly 1 illustrated in FIG. 1 is provided with a pressing ring 11 that fixes the optical members L1 through L4 and SP1 through SP3 inserted into the hollow part 100 of the barrel 10, by pressing these optical members from the side where the object-side opening 101 is formed. The pressing ring 11 has: a mounting opening 110 into which an object-side part of the barrel 10 is inserted; and an optical opening 111 for making a central part of the lens L1 exposed. Among the optical members inserted into the barrel, the lens L1 is the one disposed at the position closest to the object. Formed on an inner wall on a mounting opening side of the pressing ring 11 is a female thread SR2 in which the male thread SR1 is engaged. When the male thread SR1 is engaged in the female thread SR2, the edge of an object-side surface of the lens L1 disposed at the position closest to the object on the object side is pressed by the pressing ring 11.

The lens assembly 1 shown in FIG. 1 is assembled by using the pressing ring 11 that presses the lenses L1 trough L4 and the spacing rings SP1 through SP3 in the barrel 10 toward the image-forming-side opening.

When the lens assembly 1 assembled in this way is installed in an automobile, the strength of the barrel 10 made of porous ceramic comes into play, making it possible to sufficiently deliver predetermined performance.

In the lens assembly with the structure described above, the lenses and spacing rings are inserted to be alternately disposed inside the hollow part and finally the lens closest to the object on the object side is pressed by the pressing ring, so that the lenses and spacing rings are disposed at predetermined positions inside the hollow part. Therefore, after the lens assembly 1 illustrated in FIG. 1 is installed in an automobile, there is a possibility that the spacing rings and the lenses disposed inside the lens assembly may sequentially move in response to movement such as vibration produced while running or shock caused by acceleration or deceleration. If the spacing rings and the lenses sequentially move, predetermined performance cannot be achieved.

In this respect, it is conceivable to fix lenses in a lens frame to the lens frame with adhesion by using the technique of Japanese Patent Application Publication No. 2006-292927. Specifically, it is conceivable to provide an adhesion part and an adhesive applied part in the barrel (lens frame) 10 having the hollow part illustrated in FIG. 1, so that each lens can be fixed by externally applying an adhesive to the adhesive applied part with a needle every time the lens is inserted. However, this makes the structure of the lens frame as well as the assembly work complicated, which is a problem. In order to simplify the structure of the lens frame and the assembly work, it is conceivable to fix the lens with adhesion to the lens frame by injecting an adhesive into a through hole formed in the lens frame.

FIG. 2 is a diagram illustrating the structure of a lens assembly 1A having a lens frame 10A provided with holes H1 and H2 into which an adhesive is to be injected.

As illustrated in FIG. 2, the hole H1 and the hole H2 are formed at positions corresponding to a lens L3 and a lens L4 of the lens frame 10A, respectively. The lens L3 and the lens L4 are fixed to the lens frame 10A with adhesion by injecting the adhesive into the hole H1 and the hole H2. This structure makes the assembly work simple, without increasing the size of the lens frame 10A.

In the structure illustrated in FIG. 2 however, there is a possibility that light may enter the lens frame 10A through the holes H1 and H2 formed in the lens frame 10A, affecting the optical performance inside the lens frame 10A.

SUMMARY OF THE INVENTION

In view of the above circumstances, the present invention provides: a lens frame that maintains predetermined optical performance even when a lens inside the lens frame can be fixed with adhesion; a lens assembly having the lens frame; and an image-taking apparatus provided with the lens assembly.

A lens frame according to the present invention has a porous structure and a hollow part into which an optical member including a lens is inserted, the lens frame including:

a concave section into which an adhesive for fixing the optical member inserted into the hollow part is injected, and which has an outward opening and a spacing wall provided between the opening and the hollow part.

The lens frame of the present invention utilizes the porous structure of the material of the lens frame. In this lens frame, the concave section having the outward opening and leaving the spacing wall between the opening and the hollow part is formed, instead of the hole formed as illustrated in FIG. 2. The adhesive injected into the concave section passes through multiple pores in the spacing wall, and reaches the inner wall of the lens frame, namely, the periphery of the lens, thereby fixing the lens to the lens frame with adhesion.

In other words, there is realized a lens frame in which predetermined optical performance is maintained even when a lens inside the lens frame can be fixed with adhesion.

Here, the lens frame of the present invention may be made of porous ceramic having one type of porous structure.

The porous structure has the porosity of 10% or more.

Among porous ceramics, in particular, the one described in Japanese Patent Application Publication No. 2007-238430 is suitable for optical use because this porous ceramic is able to restrict reflection of light in a visible light area to 2% or less.

Further, a lens assembly according to the present invention includes:

an optical member including a lens; and a lens frame having a hollow part into which the optical member is inserted, wherein the lens frame has a porous structure and a concave section having an outward opening and a spacing wall provided between the opening and the hollow part, and the optical member inserted into the hollow part is fixed with an adhesive injected into the concave section.

The lens assembly of the present invention utilizes the porous structure of the material of the lens frame. In the lens frame of this lens assembly, the adhesive injected into the concave section passes through multiple pores of the porous structure, and reaches the periphery of the lens, thereby fixing the lens to the lens frame with adhesion.

In this structure, since holes like those illustrated in FIG. 2 are not formed, influence on the optical performance by entering light does not occur. In addition, when the lens assembly of the present invention is installed in an automobile, the lens and a spacing ring are prevented from shifting even when there occurs movement such as vibration produced while running or shock caused by acceleration or deceleration. Accordingly, predetermined optical performance can be maintained to a great extent.

Here, in the lens assembly of the present invention, the lens frame may be made of porous ceramic having one type of porous structure.

Among porous ceramics, in particular, the one described in Japanese Patent Application Publication No. 2007-238430 is able to restrict reflection of light in a visible light area to 2% or less and thus is suitable for optical use.

Furthermore, an image-taking apparatus according to the present invention includes:

a lens assembly including:
  an optical member including a lens, and
  a lens frame having a hollow part into which the optical member is inserted,
    wherein the lens frame has a porous structure and a concave section having an outward opening and a spacing wall provided between the opening and the hollow part, and the optical member inserted into the hollow part is fixed with an adhesive injected into the concave section; and an imaging device disposed at an image-forming surface of an image-forming optical system that is formed by the optical member inserted into the hollow part of the lens frame of the lens assembly.

According to the image-taking apparatus of the present invention, when this image-taking apparatus is installed in an automobile, the lens in the lens frame is prevented from shifting even when there occurs movement such as vibration produced while running or shock caused by acceleration or deceleration. Accordingly, predetermined optical performance is maintained.

DETAILED DESCRIPTION OF THE INVENTION

An embodiment of the present invention will be described.

Figure 3:
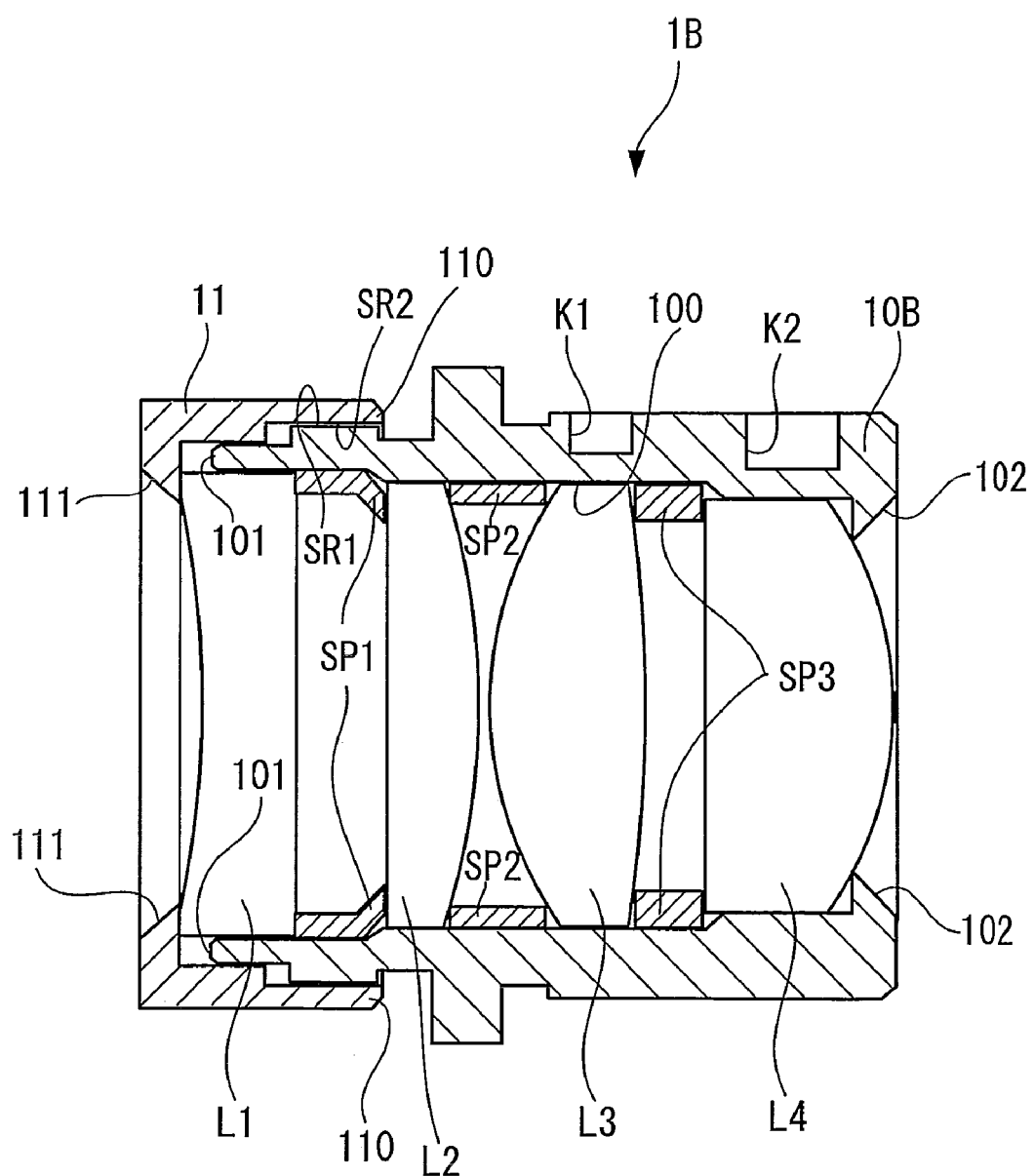
FIG. 3 is a diagram that depicts a lens assembly 1B that is an embodiment of the present invention.

FIG. 3 is a diagram that depicts a lens assembly 1B that is an embodiment of the present invention.

Figure 1:
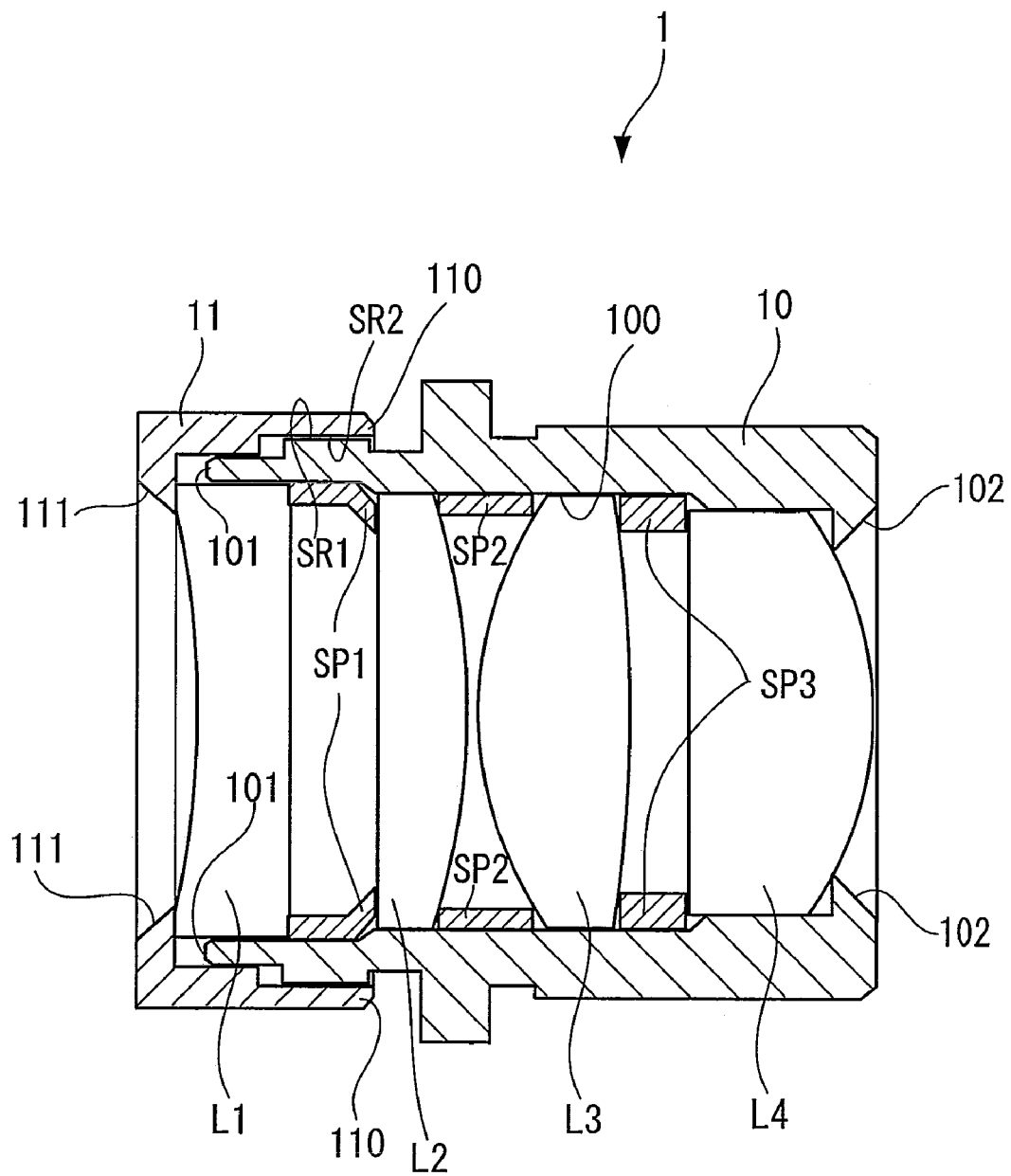
FIG. 1 is a diagram that illustrates an example of the structure of a lens assembly provided with a lens frame made of porous ceramic.
Figure 2:
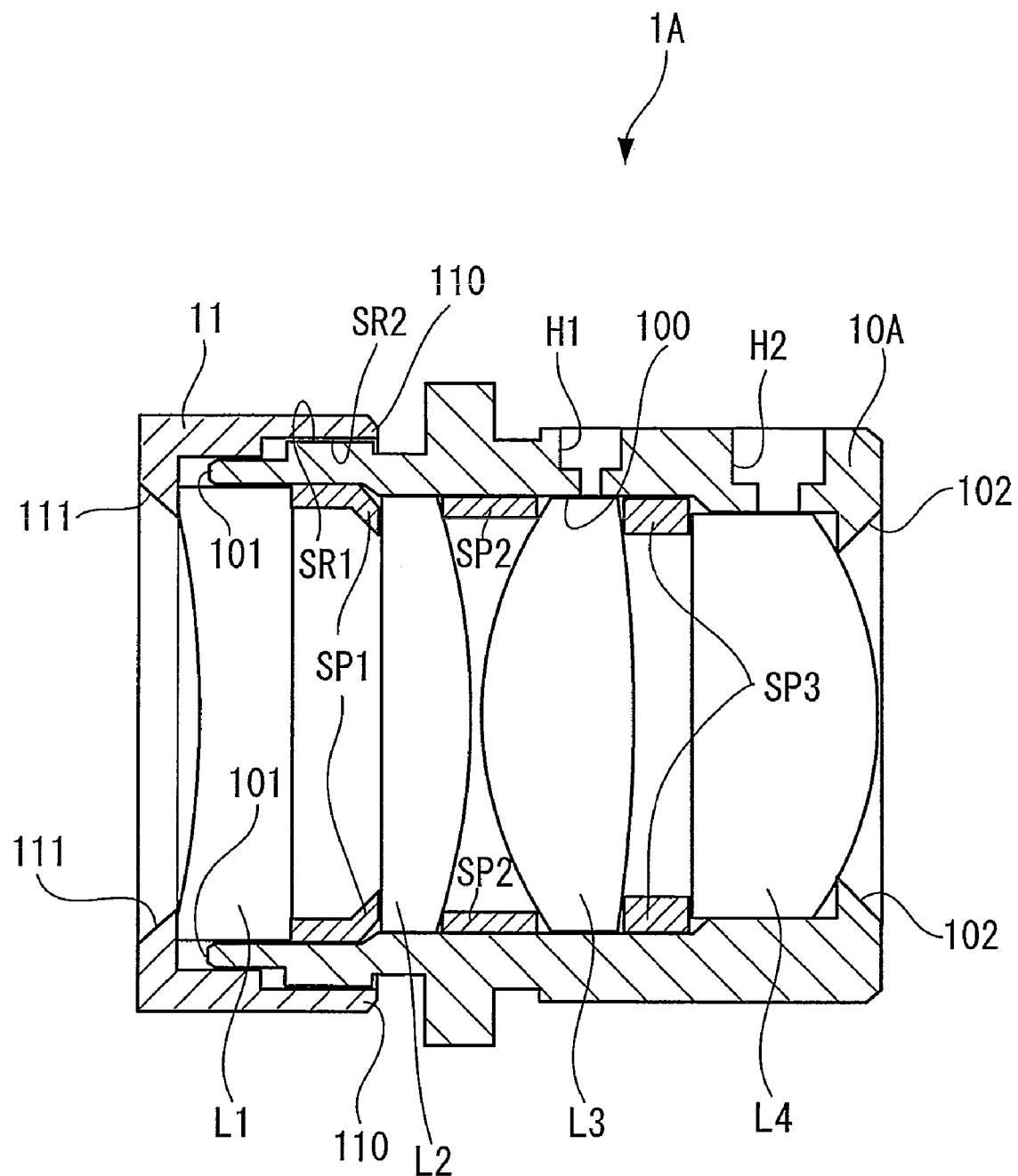
FIG. 2 is a diagram illustrating the structure of a lens assembly 1A having a lens frame 10A in which holes H1 and H2 used for injecting an adhesive are formed.

FIG. 3 illustrates the structure of the lens assembly 1B having a lens frame 10B in which concave sections K1 and K2, instead of the holes H1 and H2 illustrated in FIG. 2, are formed at positions corresponding to lenses L3 and L4 of the lens frame 10B, respectively.

The concave sections K1 and K2 formed in the lens frame 10B illustrated in FIG. 3 are externally open, and a spacing wall is formed between a hollow part 100 and each of the concave sections K1 and K2. Into the concave sections K1 and K2, an adhesive for fixing the lenses L3 and L4 that are optical members inserted into the lens frame 10B is injected.

When injected into the concave sections K1 and K2 illustrated in FIG. 3, the adhesive passes through multiple pores of the lens frame 10B made of porous ceramic and reaches the inner wall of the hollow part 100, thereby fixing the lenses L3 and L4 to the inner wall of the hollow part 100 with adhesion. Therefore, there is no need to form the conventional holes for adhesion in the lens frame 10B and thus, the optical performance can be prevented from being affected by light entering through the holes.

Further, since the lenses L3 and L4 are firmly fixed to the lens frame 10B with adhesion in this way, spacing rings SP1 through SP3 and lenses L1 through L3 disposed inside the lens frame 10B are prevented from sequentially moving, even when they are in an automobile in which there occurs movement such as vibration produced while running or shock caused by acceleration or deceleration. This makes it possible to maintain the predetermined optical performance to a great extent.

As described above, there are realized: a lens frame that maintains predetermined optical performance even when the lenses inside the lens frame are fixed to the lens frame with adhesion; and a lens assembly provided with the lens frame.

Incidentally, although the porous ceramic has been used as an example in the above-described embodiment, the same effect can be produced by employing other types of material having a porous structure such as a foam.

Lastly, there will be described an example in which the lens assembly 1B illustrated in FIG. 3 is applied to an image-taking apparatus.

Figure 4:
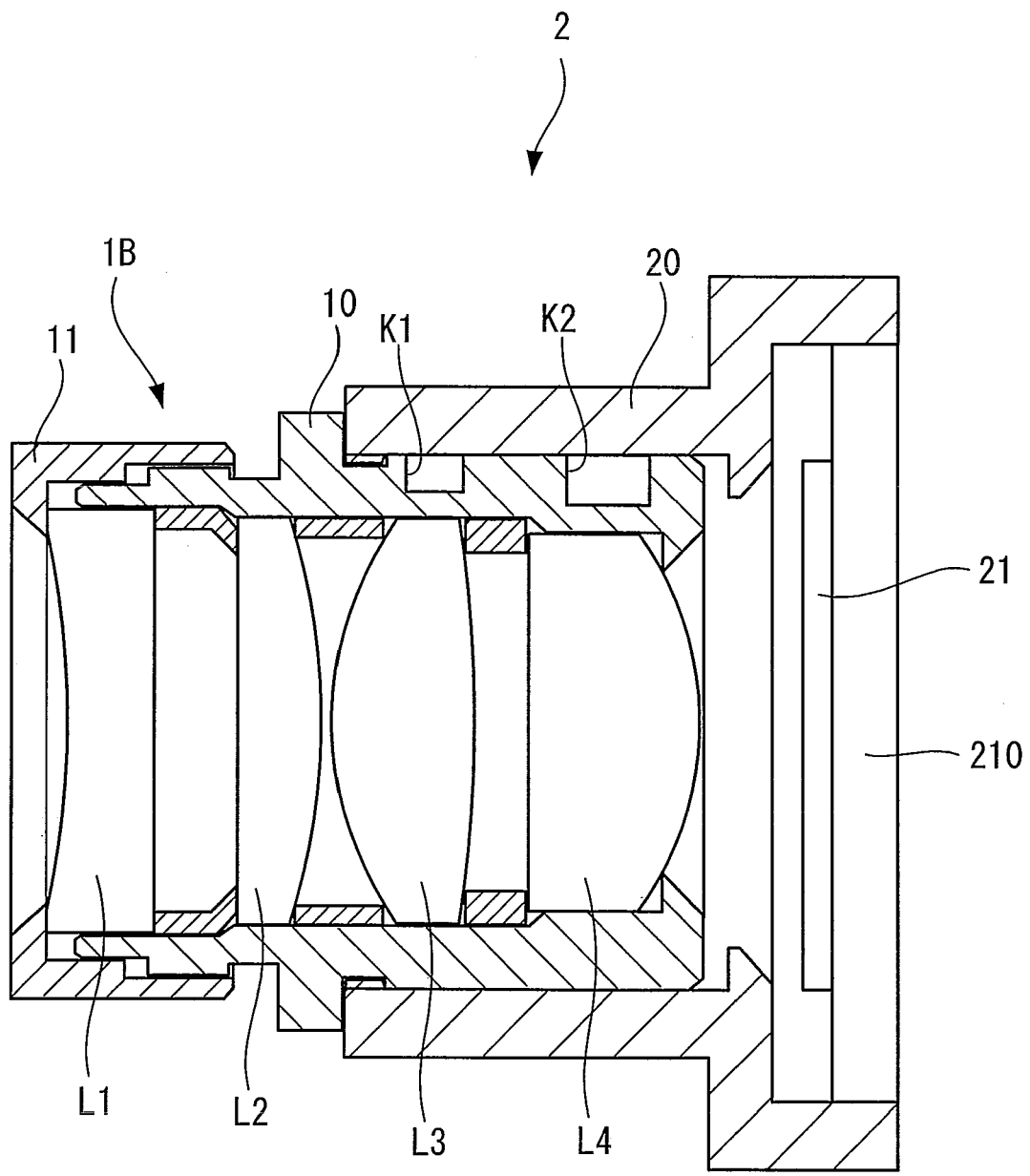
FIG. 4 is a diagram illustrating a camera unit 2 into which the lens assembly 1B illustrated in FIG. 3 is incorporated.

FIG. 4 is a diagram illustrating a camera unit 2 into which the lens assembly 1B illustrated in FIG. 3 is incorporated.

FIG. 4 illustrates a cross section of the camera unit 2, taken along an optical axis.

The camera unit 2 illustrated in FIG. 4 includes the lens assembly 1B illustrated in FIG. 3, a camera main-unit frame 20, and an imaging device 21. The imaging device 21 is implemented on an imaging-device board 210 and fixed with adhesion to the camera main-unit frame 20. An outer surface of the lens frame 10B of the lens assembly 1B shown in FIG. 3 and an inner surface of the camera main-unit frame 20 are respectively provided with thread sections.

When the camera unit 2 is assembled, at first, the lens assembly 1B shown in FIG. 3 is screwed into the camera main-unit frame 20 and then, the lens assembly 1B is fixed to the camera main-unit frame 20 with adhesion. Subsequently, the imaging-device board 210 mounted with the imaging device 21 such as a CCD solid-state imaging device is bonded to the camera main-unit frame 20 with adhesion, so that the imaging-device board 210 is positioned at an image-forming surface of an image-forming optical system formed by the lenses L1 through L4 inserted into the lens frame 10B of the lens assembly 1B. By going through this simple procedure, the lens assembly 1B illustrated in FIG. 3 can be incorporated into the camera unit 2.

When the camera unit 2 thus assembled is installed in an automobile, there is realized a camera unit provided with a lens frame containing lenses that do not shift even when there occurs movement such as vibration produced while running or shock caused by acceleration or deceleration. Accordingly, predetermined optical performance of this camera unit can be maintained even after being installed in the automobile.

As described above, according to the present invention, there are realized: a lens frame that maintains predetermined optical performance even when a lens inside the lens frame can be fixed with adhesion; a lens assembly having the lens frame; and an image-taking apparatus provided with the lens assembly.

What is claimed is:

1. A lens frame comprising:
a hollow part into which a lens member, extending in a plane perpendicular to a direction of an optical axis, is inserted and on which a periphery of the lens member is fixed by an adhesive, the hollow part being formed by
  (a) a flank section which extends between two openings and surrounds the optical axis, the two openings being an object-side opening and an image-forming-side opening which are positioned away from each other in the direction of the optical axis,
a concave section which is provided on an outer surface of the flank section, the outer surface being opposite to an inner surface of the flank section that faces the optical axis, wherein the concave section opens in an outward direction that is perpendicular to the optical axis and that extends away from the optical axis, the concave section including
  (a) a bottom surface which extends in a two-dimensional surface perpendicular to the outward direction, such that a spacing wall is formed between the bottom surface and the inner surface of the flank section, the spacing wall extending along the two-dimensional surface, and
  (b) side walls which surround a periphery of the bottom surface entirely and extend in the outward direction from the periphery of the bottom surface,
wherein
the lens frame has a porous structure at least in a part of the lens frame which includes the spacing wall,
the concave section is provided on a portion of the outer surface opposite to a portion of the inner surface that is contacted by the periphery of the lens member, and
a thickness of the spacing wall in the outward direction is set such that the adhesive, inserted into the concave section, goes through the porous structure of the spacing wall and reaches the portion of the inner surface to fix the periphery of the lens member on the portion of the inner surface.

2. The lens frame according to claim 1, wherein the lens frame is made of porous ceramic having one type of porous structure.

3. A lens assembly comprising:
a lens member which extends in a plane perpendicular to a direction of an optical axis, and
a lens frame into which the lens member is inserted,
wherein the lens frame includes
a hollow part into which a lens member, extending in a plane perpendicular to a direction of the optical axis, is inserted and on which a periphery of the lens member is fixed by an adhesive, the hollow part being formed by
  (a) a flank section which extends between two openings and surrounds the optical axis, the two openings being an object-side opening and an image-forming-side opening which are positioned away from each other in the direction of the optical axis
a concave section which is provided on an outer surface of the flank section, the outer surface being opposite to an inner surface of the flank section that faces the optical axis, wherein the concave section opens in an outward direction that is perpendicular to the optical axis and that extends away from the optical axis, the concave section including
  (a) a bottom surface which extends in a two-dimensional surface perpendicular to the outward direction, such that a spacing wall is formed between the bottom surface and the inner surface of the flank section, the spacing wall extending along the two-dimensional surface, and
  (b) side walls which surround a periphery of the bottom surface entirely and extend in the outward direction from the periphery of the bottom surface,
wherein
the lens frame has a porous structure at least in a part of the lens frame which includes the spacing wall,
the concave section is provided on a portion of the outer surface opposite to a portion of the inner surface that is contacted by the periphery of the lens member, and
a thickness of the spacing wall in the outward direction is set such that the adhesive, inserted into the concave section, goes through the porous structure of the spacing wall and reaches the portion of the inner surface to fix the periphery of the lens member on the portion of the inner surface.

4. The lens assembly according to claim 3, wherein the lens frame is made of porous ceramic having one type of porous structure.

5. An image-taking apparatus comprising:
a lens member which extends in a plane perpendicular to a direction of an optical axis,
a lens frame into which the lens member is inserted, and
an imaging device disposed at an image-forming surface of an image-forming optical system that is formed by the lens member inserted into of the lens frame
wherein the lens frame includes
    a hollow part into which the lens member is inserted and on which a periphery of the lens member is fixed by an adhesive, the hollow part being formed by
        (a) a flank section which extends between two openings and surrounds the optical axis, the two openings being an object-side opening and an image-forming-side opening which are positioned away from each other in the direction of the optical axis,
    a concave section which is provided on an outer surface of the flank section, the outer surface being opposite to an inner surface of the flank section that faces the optical axis, wherein the concave section opens in an outward direction that is perpendicular to the optical axis and that extends away from the optical axis, the concave section including
        (a) bottom surface which extends in a two-dimensional surface perpendicular to the outward direction, such that a spacing wall is formed between the bottom surface and the inner surface of the flank section, the spacing wall extending along the two-dimensional surface, and
        (b) side walls which surround a periphery of the bottom surface entirely and extend in the outward direction from the periphery of the bottom surface,
wherein
    the lens frame has a porous structure at least in mart of the lens frame which includes the spacing wall,
    the concave section is provided on a portion of the outer surface opposite to a portion of the inner surface that is contacted by the periphery of the lens member, and
    a thickness of the spacing wall in the outward direction is set such that the adhesive, inserted into the concave section, goes through the porous structure of the spacing wall and reaches the portion of the inner surface to fix the periphery of the lens member on the portion of the inner surface.

6. The image-taking apparatus according to claim 5, wherein the lens frame is made of porous ceramic having one type of porous structure.

\* \* \* \* \*